United States Patent [19]

Quanbeck et al.

[11] 4,312,621
[45] Jan. 26, 1982

[54] AUGER FOR FILLING SEEDER ON TOOL BAR CARRIER

[75] Inventors: Sherman H. Quanbeck, Aneta; Albert O. Ringdahl; David P. Desautels, both of McVille, all of N. Dak.

[73] Assignee: Wil-Rich, Inc., Wahpeton, N. Dak.

[21] Appl. No.: 101,277

[22] Filed: Dec. 7, 1979

[51] Int. Cl.³ .............................................. B60P 1/40
[52] U.S. Cl. .................................. 414/523; 198/863
[58] Field of Search ................. 414/332, 523, 526; 198/863

[56] References Cited

U.S. PATENT DOCUMENTS

| | | | |
|---|---|---|---|
| 2,809,740 | 10/1957 | Scholz | 198/863 |
| 3,263,844 | 8/1966 | Spellman | 414/523 X |
| 3,439,819 | 4/1969 | Quanbeck | 414/526 |
| 3,811,387 | 5/1974 | Meiners | 111/1 |
| 4,119,223 | 10/1978 | Flechter | 414/523 |

Primary Examiner—Robert G. Sheridan
Attorney, Agent, or Firm—Kinney, Lange, Braddock, Westman and Fairbairn

[57] ABSTRACT

An auger conveyor assembly for use with a seeder and fertilizer applicator, having tanks which are mounted onto a tool bar frame or carrier such as a field cultivator and wherein the seed tanks are generally positioned adjacent to the hitch of the tool bar frame. The auger conveyor is mounted on the tool bar frame on a member which permits moving the auger from a usable position with the receiving end of the auger adjacent the ground to a transport position. The discharge spout of the auger comprises a flexible tube which can be manipulated for filling the tanks. In transport position the hopper end of the auger is raised above the ground and the entire auger is substantially within the perimeter of the tool bar frame.

7 Claims, 8 Drawing Figures

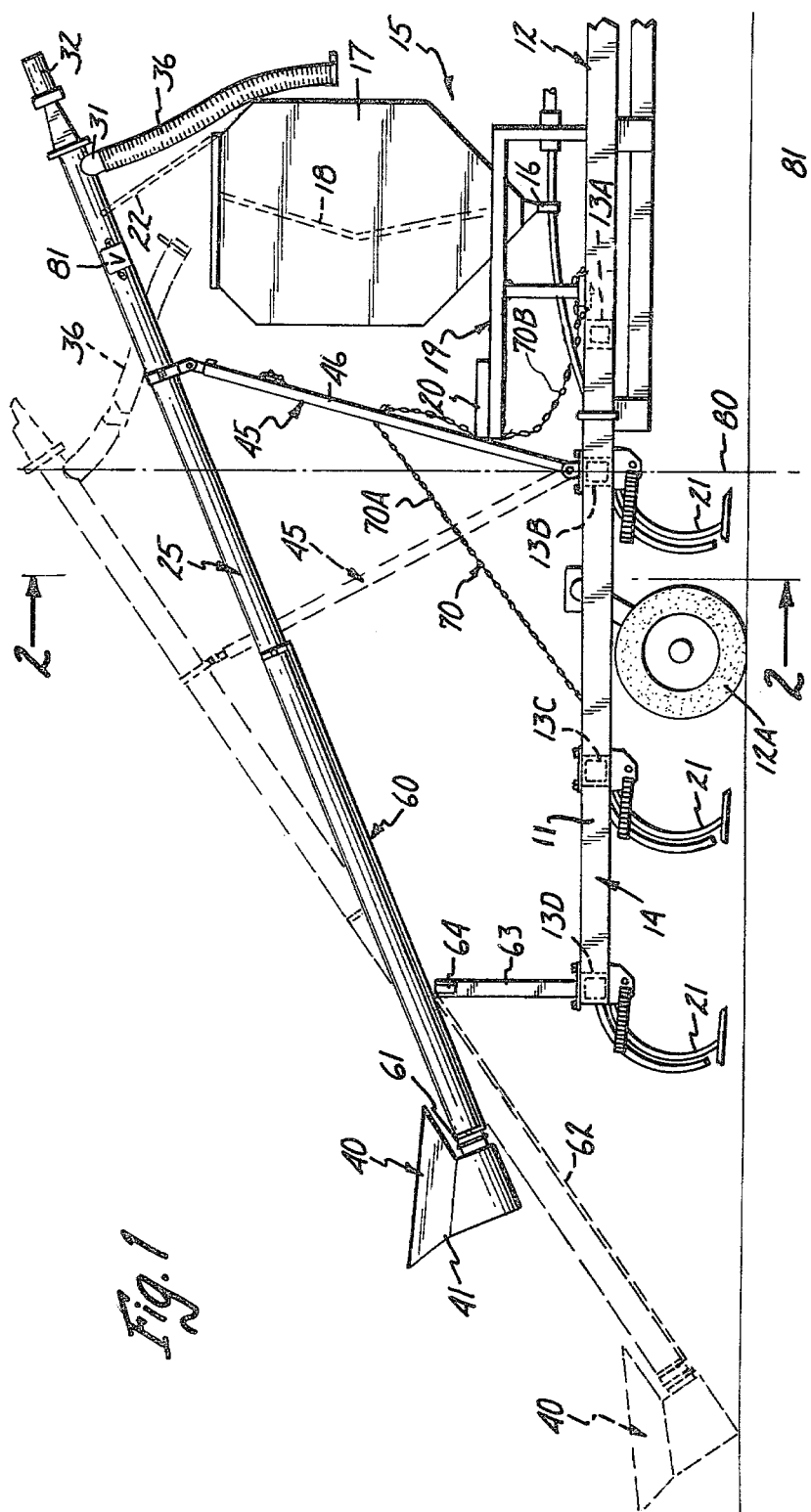
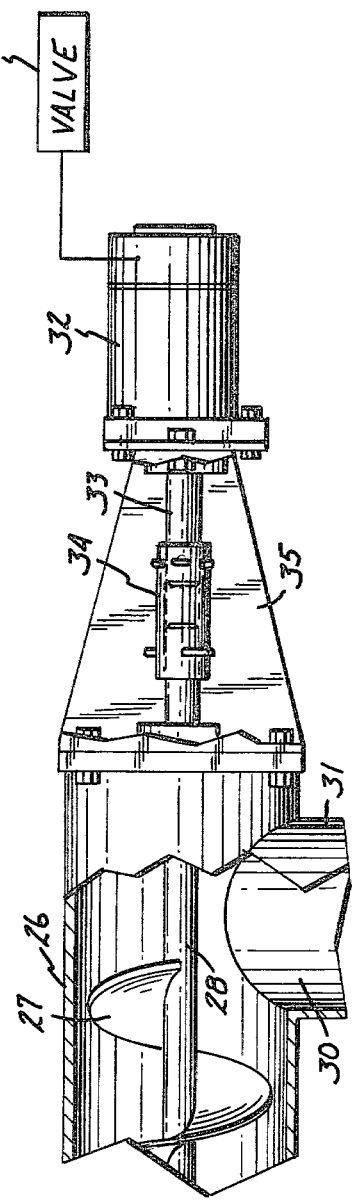

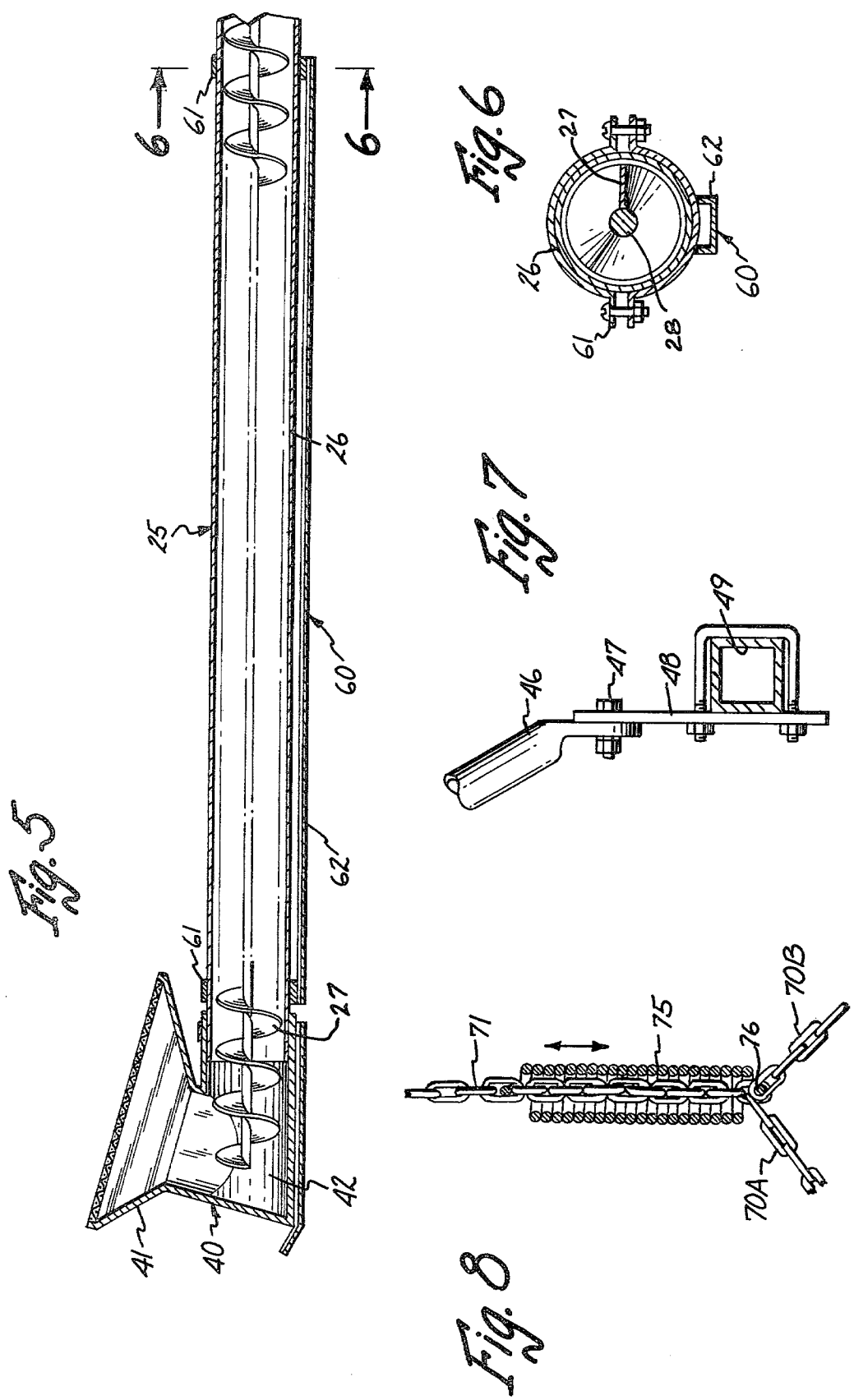

AUGER FOR FILLING SEEDER ON TOOL BAR CARRIER

BACKGROUND OF THE INVENTION

1. Field of the Invention

The present invention relates to auger assemblies used for filling seed and fertilizer tanks of seeders used primarily in connection with tool bar frames.

2. Prior Art

In the prior art, filling of grain drills and the like utilizing augers mounted in truck boxes has been advanced. For example, a drill fill system utilizing an auger mounted in a tank which is inserted into a truck box is shown in U.S. Pat. No. 3,439,819. While this type of drill fill arrangement works very well with conventional grain drills, where seeders are mounted onto tool bar frames, or other large frames, where the span of the frame is such that the truck cannot conveniently be driven anywhere near the seed and fertilizer storage tanks, the use of this type of filling system becomes more difficult.

The fill auger system shown in the present application finds great use in connection with tool bar seeders such as that mounted on large tool bar frames where there is a substantial distance in fore and aft direction of the frame, such as those which are sold by Wil-Rich Corporation, where there are more than two transverse frame members to the rear of the seed tanks.

Minimum tillage seeders such as that shown in U.S. Pat. No. 3,811,387, also are devices in which the auger assembly of the present invention is used. The device shown in Patent '387 is substantially smaller than many of the seeders commercially available, and it is in the larger units where the filling auger of the present invention finds its greatest application.

SUMMARY OF THE INVENTION

The present invention relates to a conveyor, such as an auger for use in connection with large seeder assemblies having storage tanks that are positioned a substantial distance from the peripheral edges of the frame carrying the furrow openers, such as seeder assemblies used with tool bar frames. The conveyor is mounted onto a framework pivoted to the tool bar frame. The conveyor is connected to the upper end of the pivoting framework through a universal connection permitting the ends of the conveyor to be raised and lowered about a horizontal axis and pivoted about a generally upright axis, as well as moved in fore and aft direction. The pivoting framework permits the loading end of the conveyor to be moved from a storage position, raised substantially above the surface of the ground and carried directly on the tool bar frame to a second position where the loading end is adjacent the ground and positioned to be filled from a truck carrying seed and fertilizer. At the same time, the discharge end of the conveyor is moved into a usable position above and slightly spaced from the filling openings of the storage tanks, thereby permitting a flexible hose to be used for directing the seed and/or fertilizer to the appropriate location and the filling of the storage tanks.

The mounting of the filling conveyor directly on the tool bar frame or main frame permits rapid and easy filling from a truck. Manual labor is substantially reduced, and time is saved as well.

BRIEF DESCRIPTION OF DRAWINGS

FIG. 1 is a fragmentary side view of a seeder mounted on a tool bar frame with the conveyor of the present invention incorporated thereon;

FIG. 4 is an enlarged detail view of the discharge end of the conveyor showing the drive, with portions in section and portions broken away;

FIG. 5 is a longitudinal section of the conveyor adjacent the hopper or loading end thereof;

FIG. 6 is a sectional view taken on the line 6—6 in FIG. 5;

FIG. 7 is a detailed view showing the pivotal mounting of the conveyor support framework to the tool bar frame; and FIG. 8 is a detailed view of a chain and spring arrangement used for limiting travel of the conveyor support frame in opposite directions of pivoting.

DESCRIPTION OF THE PREFERRED EMBODIMENT

Figure 2:
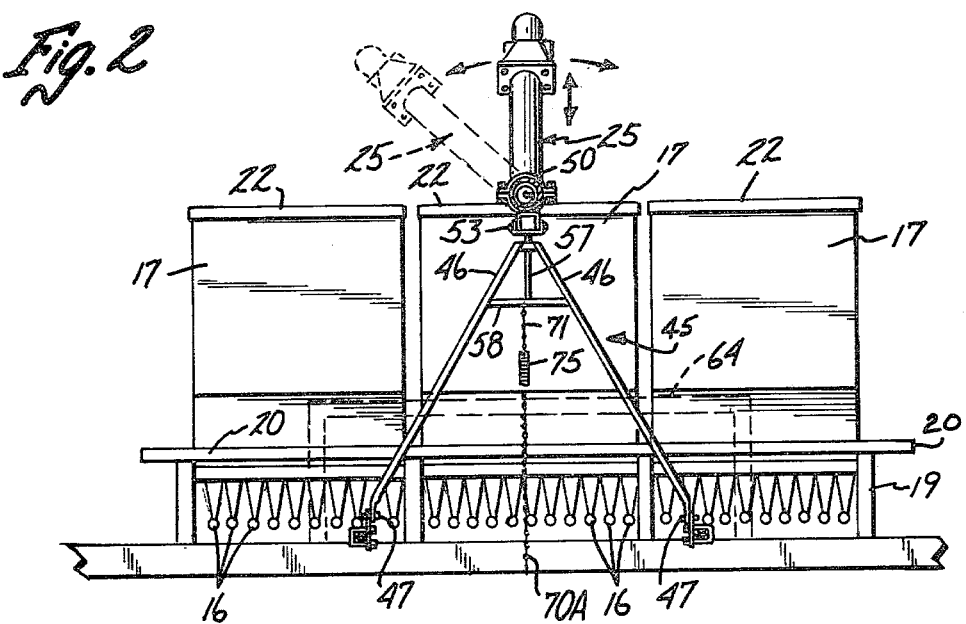
FIG. 2 is a sectional view taken generally along the line 2—2 in FIG. 1.

Referring first to FIG. 1, schematically shown thereon is a seeder assembly indicated generally at 10 which is mounted on a tool bar frame assembly, comprising a main frame shown schematically at 11. The tool bar frame has a hitch portion 12 which extends toward a prime mover such as a tractor (not shown) and has several, as shown schematically, four, transversely extending sets of frame members 13A, 13B, 13C and 13D which are held together in the frame assembly with fore and aft extending frame members such as the outer side frame members 14 shown in FIG. 1. Additional fore and aft extending members can be used as desired. Some of the frame members may not extend continuously across the tool bar frame. For example, the cross members may join intermediate longitudinal frame members in the center portions of the frame assembly.

The frame assembly 11 is supported on ground engaging wheels shown schematically at 12A. Usually these are tandem type wheels, but a single wheel is shown for illustrative purposes. The wheels in turn are mounted onto suitable raising and lowering mechanisms so that the frame 11 can be raised and lowered relative to the ground through the use of hydraulic cylinders in a normal manner for tool bar frames and tool bar cultivators.

In this particular assembly, shown schematically at 15 is an air seeder arrangement such as that shown in United States Patent Application Ser. No. 892,985, filed Apr. 3, 1978 and assigned to the same assignee as this application. The showing is schematic for illustrative purposes, and the air seeder will include a source of low pressure air moving through nozzles shown at 16. Seed and/or fertilizer is metered into the nozzle assemblies 16 from storage tanks 17, each of which is compartmented with a center divider wall 18 and has seed in one side of the divider wall and fertilizer in another. The metering may be done as desired and the nozzle assemblies 16 will direct seed and fertilizer through individual delivery tubes to individual field cultivator shank assemblies which operate as furrow opener assemblies shown at 21. The metered seed and fertilizer is deposited behind the shovel of the corresponding shank assembly 21. The showing is only schematic, for illustrative purposes, and various types of seeding attachments can be used.

The storage tanks 17 in the form shown have dividing walls 18 that divide each tank into two individual sections, one for fertilizer and one for seed. However, in this form, the storage tanks 17 each have a single cover shown at 22 that can be raised for filling.

Referring to FIG. 2, three storage tanks 17 are shown. Usually these storage tanks are only about three feet wide for each ten feet of width of the tool bar frame. Thus the tanks are spaced substantially in from the side edge frame members 14 of the tool bar frame (which typically will be thirty feet or more wide) as well as quite a distance from the rear frame member 13D, so that getting to the storage tanks 17 for filling is a substantial task. The tanks are mounted on a frame 19 which is suitably attached to the tool bar and includes an operator's walkway 20.

The filling of the tanks is greatly simplified by the use of a material conveyor comprising an auger assembly indicated generally at 25. The auger assembly includes an auger tube 26 which has an interior helical auger 27 of usual type attached to a central shaft 28. Referring to FIG. 4, at the discharge end of the auger assembly 25, and the tube 26, there is a discharge opening 30 and a short spout connector 31 coming from this discharge opening. Additionally, a hydraulic motor 32 has an output shaft 33 driving the auger shaft 28 through a coupling 34. The motor 32 is mounted on a suitable motor support 35 which in turn is mounted on the auger tube as shown.

A flexible filling spout extension 36 which is of suitable length so that it can be used for reaching the openings of each of the compartments 17 when filling is connected to the outlet spout 31. The opposite end of the auger tube 26 from the discharge end has a hopper 40 of usual design which has a flared upper section 41 that is designed to be positioned below the end gate of a truck (not shown) and receive either fertilizer or seed from the truck. The end of the auger flight 27, as can be seen in FIG. 5, protrudes into the lower end 42 of the hopper 40 and material in this lower end 42 of the hopper will be picked up by the auger flights and conveyed upwardly along the interior of the auger tube 26 in the normal manner when the motor 32 is driven.

The auger tube 26 is supported on a pivoting A-frame assembly indicated generally at 45 which has a pair of legs 46,46. The lower ends of the legs 46 are pivotally mounted on suitable bolts or pins 47 to a pair of brackets 48 attached to a pair of fore and aft extending frame members shown at 49 (see FIG. 7 for detail). The bolts 47 form a pivot axis for the legs 46.

Figure 3:
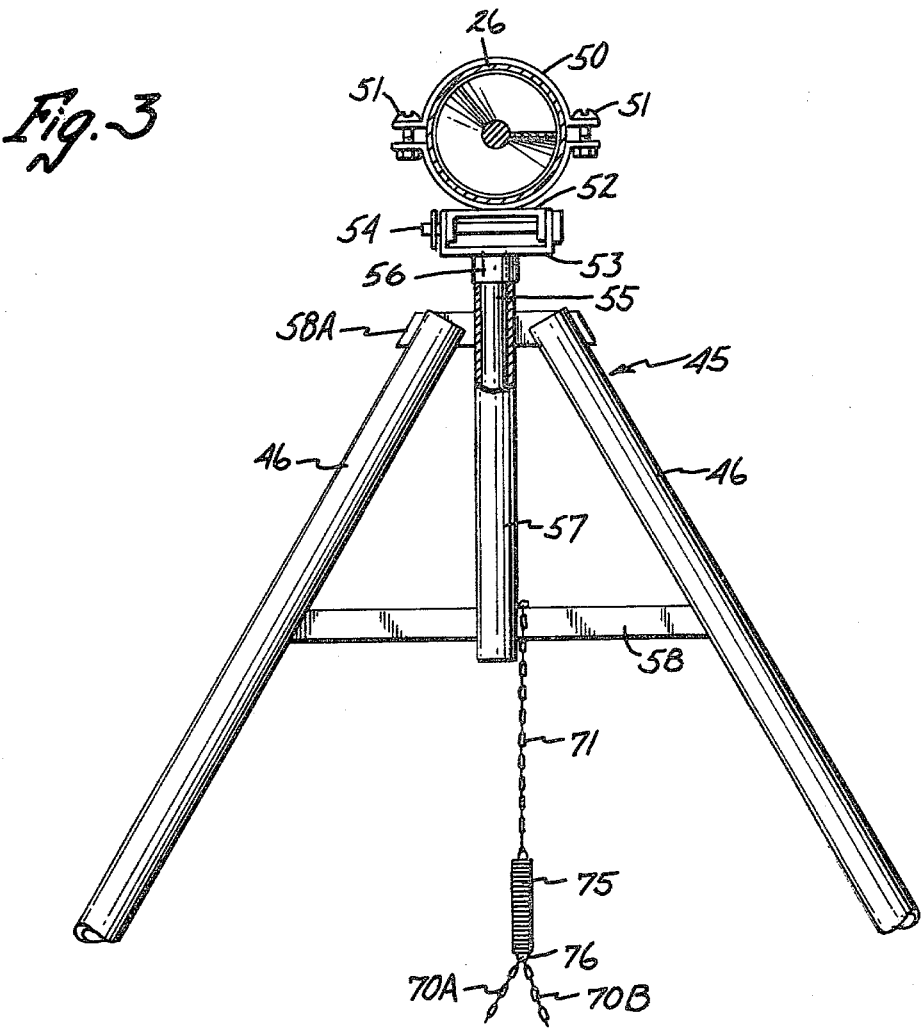
FIG. 3 is an enlarged fragmentary detail of a conveyor mounting frame of the present invention with parts in section and parts broken away.

At the upper end of the A-frame 45 there is a universal pivoting connector assembly for supporting the auger tube. As shown in FIG. 3, the auger tube 26 has a clamp 50 around the outer surface thereof which is clamped in place in the normal manner through the use of fasteners 51. The lower portion of the clamp 50 has a pivot bracket 52 fixed thereto that has a pair of spaced depending legs received between a pair of legs of the upper end of a yoke 53. The pivot bracket is joined to the yoke with a pivot pin 54 that extends along a generally horizontal axis and passes through the legs of the brackets 52 and yoke 53 to permit the clamp 50 and thus the auger tube to pivot about a generally horizontal axis. The yoke 53 in turn has a pivot shaft 55 attached thereto which is passed through a suitable thrust bearing or collar 56 and then rotatably mounted in a sleeve 57 that is fixed to braces 58 and 58A which hold legs 46 of the A-frame 45 together. The yoke 53 extends above the A-frame slightly. Sleeve 50 is oriented so that the axis of the sleeve is generally parallel to the plane of the A-frame 45. Sleeve 57 forms a pivot axis generally perpendicular to the axis of the pin 54. This means that the bracket 50 can universally pivot about two mutually perpendicular axes at the upper end of the A-frame 45.

The clamp 50 is positioned along the auger tube 26 at a suitable location between the discharge end and the hopper 40. As shown, it is approximately one-third of the distance of the tube from the discharge end.

Adjacent the hopper end of the auger tube 26 and for a distance along the tube, an auger slide assembly 60 is mounted. The auger slide assembly comprises first and second clamps 61 that are clamped onto the auger tube, and which clamps carry a channel iron slide member 62 that is positioned below the auger tube, as perhaps best seen in FIG. 6. The auger slide assembly 60 rests upon a framework 63 mounted to the rear frame member 13B and extending upwardly therefrom. The framework 63 has a cross member 64 of suitable transverse width as shown in dotted lines in FIG. 2, against which the auger slide assembly 60 slides.

A limit chain assembly 70 is provided for limiting pivoting movement of the A-frame 45. The chain assembly has one length 70A with one end anchored to the cross frame member 13D. A second length of chain 70B has one end connected to a cross frame member of the seeder assembly. The other ends of lengths 70A and 70B are connected in the center portion to a single strand of chain 71 which in turn is connected to cross member 58 on which the tube 57 is also mounted. The chain sections 70A and 70B are connected at their junction to one end of a spring 75, as shown at 76. The spring 75 can be adjusted so that there is enough slack in the chain that passes through the spring, as shown in FIG. 8, to permit the spring to expand when the auger and A-frame are moved to storage (transport) or working positions. The spring loads the A-frame in each of its directions of movement to aid in handling. As shown in FIG. 8, in dotted lines, the chains can be kept loose on the interior of the spring and also if desired, the spring can be connected to leave loose links at the ends of the spring. The spring can be made to expand a desired amount and help in moving the auger manually when it is in its transport position or its lowered working position with a spring bias.

FIG. 1 shows the auger assembly in its transport position for use when the unit is being used as a seeder. While the furrow openers 21 are not shown in the ground, they would be during the seeding operation. In transport position, the auger assembly is moved so that the A-frame 45 is pivoted forwardly and the hopper end is lifted up and supported on the cross bar 64 through the auger slide assembly 60. The discharge end of the auger is forwardly of the compartment 17 as shown and the auger assembly is substantially all within the periphery of the tool bar frame. The auger and A-frame will stay in this position during transport because the center of gravity is over the vertical plane indicated at 80 passing through the axis of pivot pins 47 for pivoting the A-frame 45. When compartments 17 are to be filled, a truck can be driven transversely to the tool bar frame adjacent the rear of frame assembly 11 so that the truck box end gate is laterally past the hopper 40, for example, with the rear of the truck slightly to one side of the center line of the frame when viewed in FIG. 2. The operator then pulls the hopper rearwardly. This will cause the A-frame 45 to pivot rearwardly about pins 47, and the auger slide member 62 will slide along the frame cross bar 64. As the A-frame pivots, the discharge end of the auger moves up, and the hopper moves downwardly to a position generally as shown in FIG. 1 in dotted lines. The auger hopper will rest on the ground and the discharge end of the auger thus is to the rear of the tanks 17, adjacent the operator's platform 20. The flexible spout 36 can be manually manipulated easily to direct material into the openings for the tanks 17. The hopper 40 can be moved transversely to position it directly below the end gate opening of a truck or trailer carrying seed or fertilizer. Then, the material is dropped into the hopper and the auger can be started by operating a suitable valve 81 for motor 32 that is located in a convenient position for the operator of the seeder, generally up near the discharge end of the auger tube as shown in FIG. 1, so that the operator can control the auger as he manipulates the flexible spout 36. Once the auger drive motor is running, the end of the flexible spout 36 can be directed in the desired compartment inside of the tanks 17 and each of the compartments in the tanks can be filled.

Also, when done, the auger can be shut off and can again be slid to its solid line position shown in FIG. 1 and retained there for transport. If desired, the auger can be tied down or fastened in a suitable manner. The auger motor may be powered from the hydraulic system of the tractor pulling the seeder.

The auger tube is capable of being swiveled up and down about the pin 54, and also about the vertical axis of the shaft 55 for proper positioning of hopper 40 in relation to the end gate of a truck as well as for ease of movement between its working and transport position. The A-frame may pivot rearwardly and at the same time the auger tube pivots about the horizontal axis of pin 54 relative to the A-frame 45.

It should be noted that the A-frame 45 forms a pivoting auger support that supports the auger in a proper location as it is moved fore and aft relative to the seeder assembly and the slide bar 64 guides the auger and supports the auger as it moves from working to transport position. Movement about the axis of shaft 55 permits the hopper to be properly positioned for filling.

What is claimed is:

1. For use in connection with an agricultural implement having a frame with peripheral edges and having storage tanks for particulate material mounted on said frame, wherein the storage tanks are spaced a substantial distance from the peripheral edges of the frame accessible to supply vehicles, and extend upwardly from the frame a substantial distance, the improvement comprising means for loading particulate material into said storage tanks including an elongated conveyor member having a longitudinal axis, a hopper to receive material at one end of the conveyor, and a discharge conduit at the other end of the conveyor, a conveyor support mounted on said frame including a generally upwardly extending member, first means to pivot said conveyor support adjacent said frame and second means to pivot said conveyor to said conveyor support at the upper end thereof about substantially parallel axes transverse to the conveyor longitudinal axis, said conveyor support being pivoted to the conveyor at a position more closely spaced from the distance end than from the hopper end and forming the sole support for the discharge end, the discharge end thereby being supported above the storage tanks and tending to counterbalance the hopper in respect to the connection of the conveyor to the conveyor support, said conveyor being otherwise unsecured to permit said conveyor to be manually moved relative to said frame in a direction along its longitudinal axis while supported on said support between a first position wherein the major part of the conveyor is within the space defined by the peripheral edges of said frame and a second position wherein the hopper end of said conveyor protrudes outwardly from one side edge of said frame, and means adjacent the edge of the frame for slidably supporting the hopper end of the conveyor with the conveyor in its first position.

2. The improvement of claim 1 wherein the pivot axis of the first means to pivot is located so that the conveyor support moves through a vertical plane passing through the first pivot means pivot axis in direction toward the storage tanks as the conveyor moves to the first conveyor position, the center of gravity of the conveyor also passing through the vertical plane as the conveyor moves to its first position, and means to limit the amount of pivoting of the conveyor support in direction toward the storage tank to determine the first position.

3. For use in connection with a seeder having a frame with peripheral edges and having storage tanks for particulate material mounted on said frame, wherein the storage tanks are spaced a substantial distance from the peripheral edges of the frame accessible to supply vehicles, the improvement comprising means for loading particulate material into said storage tanks including an elongated conveyor member having a longitudinal axis, a hopper to receive material at one end thereof, and a discharge conduit at the other end, a conveyor support mounted on said frame including first means to pivot said conveyor support to said frame about a first axis and second means to pivot said conveyor to said conveyor support about a second axis parallel to the first axis and transverse to the conveyor longitudinal axis, said conveyor also being pivotally mounted to the conveyor support about an additional axis substantially perpendicular to the parallel axes to permit the hopper to be moved laterally relative to the frame about the additional axis, and the conveyor being otherwise unsecured to permit said conveyor to be moved relative to said frame in a direction along its longitudinal axis while supported on said conveyor support between a first position wherein substantially the entire conveyor overlies said frame and a second position wherein the hopper end of said conveyor protrudes outwardly from one side edge of said frame, the pivot axis of the conveyor support to the frame being located so that the discharge end of the conveyor tends to raise and the hopper moves in direction toward the ground as the conveyor is first moved from its first position toward its second position, said discharge conduit being in a position to permit filling of said storage tanks when said hopper of said conveyor is adjacent the ground and the conveyor is in its second position.

4. The improvement of claim 3 wherein the conveyor comprises an auger assembly.

5. The improvement of claim 3 wherein said frame includes a support bar adjacent one edge, said conveyor slidably engaging said support bar and being slidably movable along and transversely to the support bar.

6. For use in combination with a tool bar frame having peripheral edges and further having storage tanks for particulate material which is to be dispensed from the tanks mounted on said frame, wherein the storage tanks are spaced a substantial distance from accessible peripheral edges of the frame, the improvement comprising means for loading particulate material into said storage tanks including an auger conveyor, a hopper at one end of said auger conveyor and a discharge conduit at the other end, an A-frame auger support having a pair of legs tapering together in direction away from said tool bar frame, first means to pivot said A-frame to said tool bar frame about a generally horizontal axis and means to mount said auger to said A-frame at location spaced from the first axis to permit pivoting the auger conveyor about two mutually perpendicular axes, whereby said auger conveyor can be moved relative to said tool bar frame while supported on said auger support between a first position wherein the auger conveyor substantially overlies said tool bar frame, and a second position wherein the hopper end of said auger conveyor protrudes outwardly from the side edges of said tool bar frame, said hopper end of said auger conveyor being slidably supported to permit movement of the auger conveyor as guided by the pivotal mounting to the second auger position, said discharge conduit then being in a position to permit filling of said tanks from the auger conveyor.

7. The improvement as claimed in claim 6 wherein the upper portion of the A-frame pivots from a first side of a vertical plane passing through the pivot axis of the first means to a second side of said plane as the auger conveyor moves between the first and second positions.

* * * * *